United States Patent

[11] 3,552,440

| [72] | Inventor | Thomas H. Smith |
| --- | --- | --- |
| | | West Palm Beach, Fla. |
| [21] | Appl. No. | 790,124 |
| [22] | Filed | Jan. 9, 1969 |
| [45] | Patented | Jan. 5, 1971 |
| [73] | Assignee | Hercules Concrete Pumps, Inc. |
| | | Laurel, Miss. |
| | | a corporation of Mississippi |

[54] VALVE FOR CONTROLLING FLOW OF CONCRETE
10 Claims, 5 Drawing Figs.

[52] U.S. Cl. .................................................. 137/625.47,
   251/315
[51] Int. Cl. ................................................. F16k 5/06
[50] Field of Search ....................................... 251/315,
   170, 314, 164, 124; 137/330, 329, 329.01, 329.02,
   329.03, 329.04, 329.05, 329.06, 625.47, 625.46

[56] References Cited
UNITED STATES PATENTS

| 1,724,940 | 8/1929 | Jones | 137/329.03 |
| --- | --- | --- | --- |
| 1,746,609 | 2/1930 | Schellin | 251/314X |
| 1,784,381 | 12/1930 | O'Stroske | 251/315X |
| 2,384,783 | 9/1945 | Longenecker | 137/625.47X |
| 2,589,012 | 3/1952 | Longenecker | 137/329 |
| 2,698,731 | 1/1955 | Koehler et al. | 251/315X |
| 3,100,499 | 8/1963 | Bass | 251/315X |
| 3,256,910 | 6/1966 | Cupp | 251/310X |
| 3,339,887 | 9/1967 | Hutchens | 251/315X |
| 3,458,172 | 7/1969 | Burrows | 251/368X |
| 3,476,057 | 11/1969 | McElroy | 137/625.47X |
| 3,096,965 | 7/1963 | Margus et al. | 251/315 |

FOREIGN PATENTS

| 571,672 | 3/1959 | Canada | 251/170 |
| --- | --- | --- | --- |
| 856,698 | 12/1960 | Great Britain | 251/164 |

Primary Examiner—M. Cary Nelson
Assistant Examiner—Michael O. Sturm
Attorney—Shoemaker & Mattare ABSTRACT: A cast housing rotatably supports a stainless steel ball valve having three ports formed therein to provide a three-way arrangement. First and second valve seat means extend through openings formed in the housing and engage the outer surface of the ball valve. Sealing means is disposed between each of said valve seat means and the housing to provide a fluid-tight seal. Means is provided for adjusting the position of each of said valve seat means with respect to the housing to compensate for wear of the components.

PATENTED JAN 5 1971

INVENTOR

THOMAS H. SMITH

BY Shoemaker and Mattare

ATTORNEYS

INVENTOR
THOMAS H. SMITH
BY Shoemaker and Mattare
ATTORNEYS

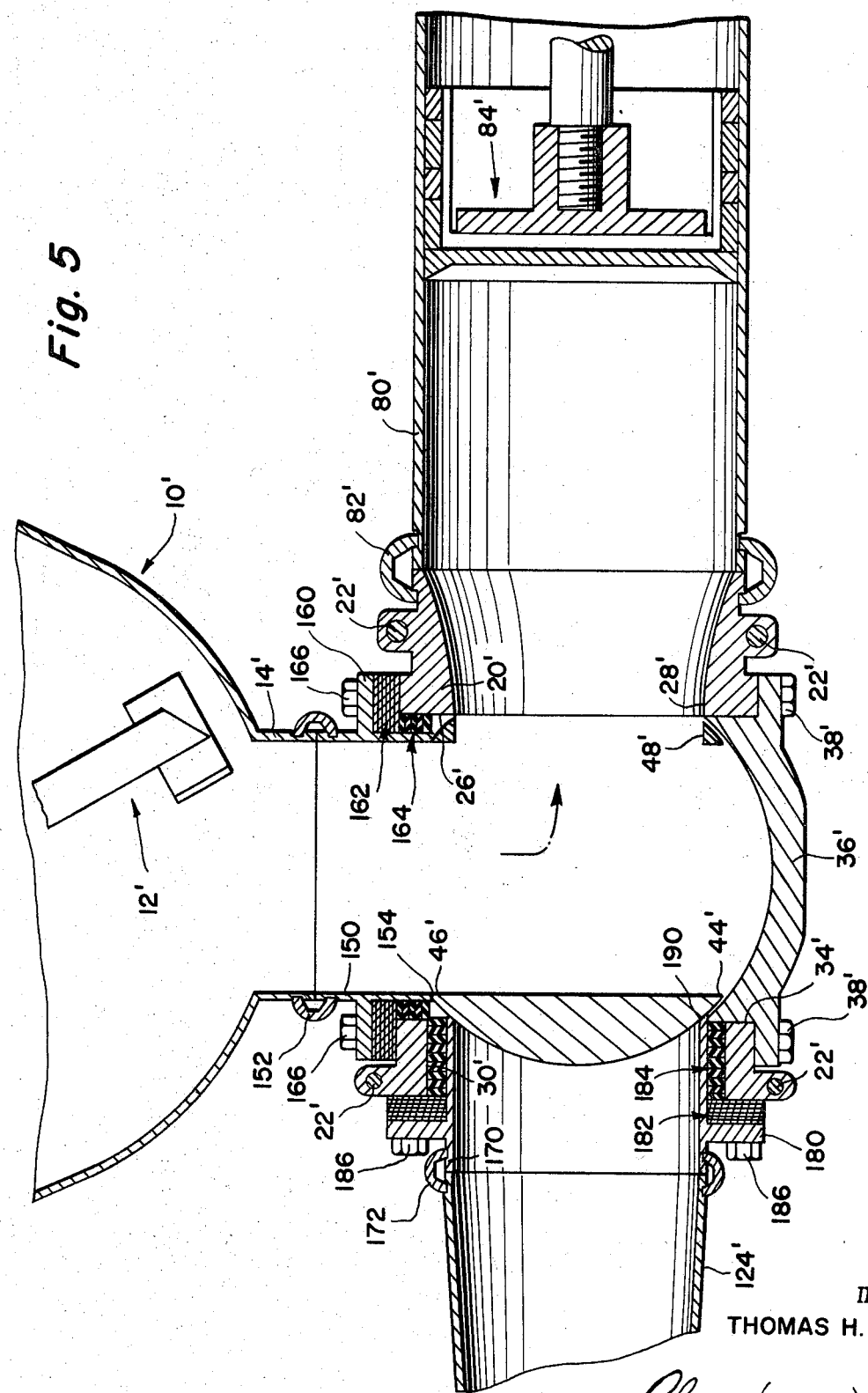

«3,552,440»

VALVE FOR CONTROLLING FLOW OF CONCRETE

BACKGROUND OF THE INVENTION

In normal concrete construction, approximately 60 percent coarse aggregate is used in relation to the volume of fine aggregate such as sand or the like. Concrete with this ratio of coarse to fines is quite difficult for most concrete pumping machines to handle through the valving mechanism associated therewith, and the concrete mix may be designed down to as low as 40 percent coarse to 60 percent fines in order to allow the concrete to be pumped into place.

When the percentage of coarse material in the concrete is reduced and replaced with fines, greater amounts of cement must be added so that the ultimate strength of the hardened concrete remains the same. Since cement is the most costly constituent of concrete, such changes in the mix design considerably increase the cost, and in many cases the economical considerations have prevented contractors from utilizing concrete pumps on their jobs.

Highly sanded concrete is also considered to be undesirable due to such facts as high shrinkage, long range creep, and longer periods of time necessary before the finishing trade can start troweling the fresh concrete due to the additional water that must be added to obtain the necessary plasticity to place the concrete properly. Furthermore, building contractors do not like to make changes in concrete mix design since the responsibility for the ultimate performance of the concrete then falls on their shoulders.

Modern concrete pumping machines are mounted on light trucks and trailers which generally utilizer 3 and 4-inch pipes and hoses in combination. The pipe is run as close to the point of pour as possible and then rubber hoses are employed for conducting the concrete the rest of the way, the flexibility of the hose allowing the workman to place the concrete such that a minimum of shoveling and screeding is necessary.

Since a concrete pump must handle a plastic mixture that is composed of approximately 85 percent solids by volume with some of the solids measuring as large as 1½ inches in diameter, a highly specialized valve must be employed for handling, diverting and cutting off flow of the concrete. Such a valve must be able to handle an optimum amount of coarse aggregate while giving reasonable trouble-free service and allowing the equipment to keep operating even if there is a breakdown in one of the valve portions, and furthermore the valve must be relatively easy to adjust and maintain.

As a practical matter, a concrete pump doing major work should include two concrete pumping cylinders working 180° out of phase with one another so that if either of these cylinders should break down the other cylinder can continue to function. Each pumping cylinder should be provided with its own associated valve means which will allow the reciprocating piston within the pumping cylinder to alternately suck concrete from a supply hopper into the associated pumping chamber and then close off communication with the supply hopper and open up communication with an outlet conduit so that the piston can force the concrete out to the point of pour on the job. The valves can also be so arranged that in case one of the valves breaks down, the other one can continue to function.

It is particularly desirable to provide a construction wherein the concrete will have a laminar flow, and any reduction in the area of a duct or conduit should be accomplished smoothly by the utilization of tapered walls.

The pressure drop across the valve should be as low as possible to help prevent the lost of moisture through the opening in the valve housing which communicates with the supply hopper, and the concrete should follow a relatively straight round path from the pumping chamber to an associated outlet conduit.

Additionally, the intake opening from the supply hopper should be located as close to the head of the pumping piston in its fully extended position as possible so as to minimize the amount of dead concrete that remains in the valve chamber between strokes of the pump.

The valve must also be of such a construction that the portions thereof in contact with the concrete can withstand the abrasiveness of the flowing material and must also be strong enough to crush the coarse aggregate particles if and when they should get in the path of motion of portions of the valve.

It is also important to provide an effective sealing means so as to minimize the loss of water from the concrete since such loss of water will lower the plasticity of the concrete to the point where it may become nonplastic and unpumpable.

Considerable wear may occur during operation of the apparatus due to the nature of the concrete material, and accordingly means must be provided for compensating for such wear. The various bearing areas which support movable parts should be of a bushing type so that they can be removed and replaced with a minimum amount of trouble and expense.

Pressures as high as 400 p.s.i. are developed during operation of the apparatus, and accordingly it is a particularly difficult problem to maintain an effective seal between the relatively fixed components of the apparatus and the movable ball valve.

SUMMARY OF THE INVENTION

In the present invention, a cast housing is formed of two halves which are bolted together and which rotatably support a ball valve having a spherical outer surface. First and second valve seat means extend through certain openings of the housing and engage the outer surface of the ball valve, these valve seat means being adjustable with respect to the housing so as to take up wear occurring during operation of the apparatus.

The cross section of the concrete flow channels is substantially round throughout the construction of the apparatus, and a relatively straight flow path is provided from the associated pumping chamber to the associated outlet conduit.

The housing of the valve includes a tapered wall portion where the cross-sectional area of the flow path is reduced, the cross section of this tapered wall portion defining a hyperbolic curve. The construction as discussed hereinabove affords a substantially laminar flow of the concrete.

The adjustable valve seat means enables a close fitting tolerance to be provided between the valve seat means and the rotating ball valve to provide an effective seal so as to reduce the flow of moisture outwardly of the valve to a minimum.

Seal means is also provided between the housing and the journaled areas between the valve seat means and the ball valve. These seals can be easily replaced and additionally serve to prevent the loss of moisture from the valve.

The concrete valve of the present invention can handle much higher ratios of coarse aggregate to fine aggregate in concrete than valves of the prior art used in similar applications.

BRIEF DESCRIPTION OF THE DRAWINGS

FIG. 5 is a view similar to FIG. 2 illustrating a modified form of the invention.

DESCRIPTION OF THE PREFERRED EMBODIMENT

Figure 2:
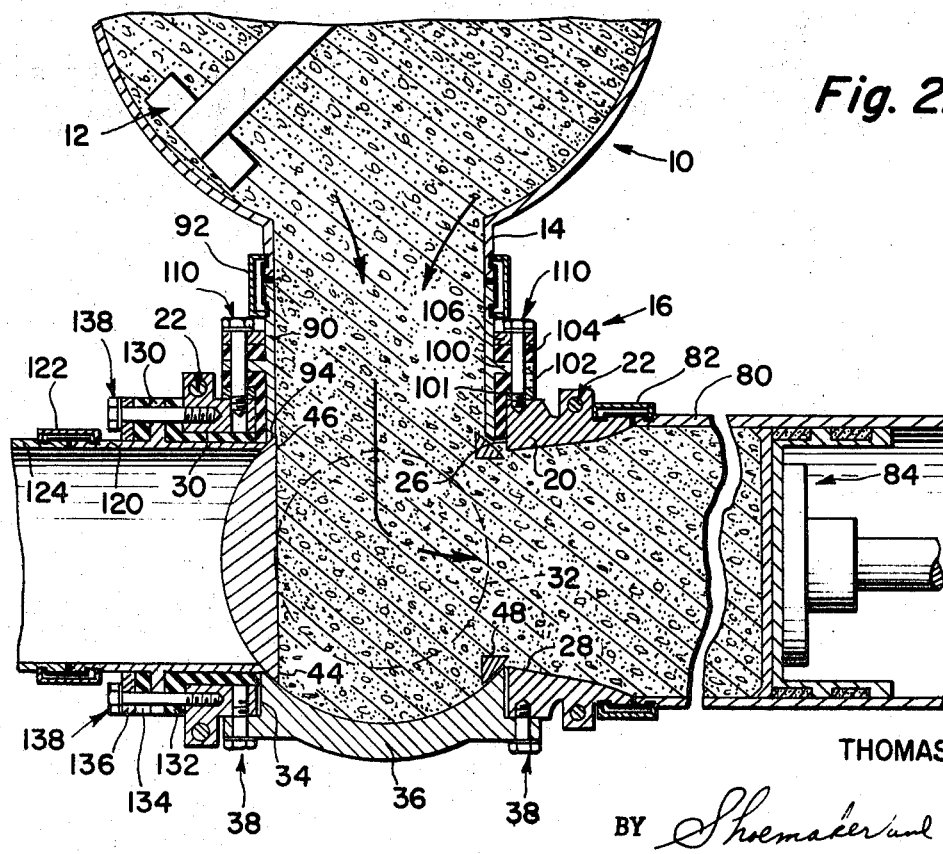
FIG. 2 is a vertical sectional view partly broken away through the structure shown in FIG. 1 and illustrating the parts in a first operative position.

Referring now to the drawings wherein like reference characters designate corresponding parts throughout the several views, a supply hopper 10 for receiving concrete is provided, this supply hopper in a typical example being mounted upon a mobile vehicle. As seen in FIG. 2, a remixer means 12 is mounted within the hopper and is secured to a shaft so as to be rotated and to properly agitate the concrete in a well-known manner. A tubular outlet portion 14 is provided at the bottom part of the hopper.

The valve of the present invention is indicated generally by reference numeral 16 and includes a housing comprising two cast halves 18 and 20 which are mirror images of one another and which are interconnected with one another by nut and bolt assemblies 22 extending through suitable aligned holes provided in the two halves of the housing.

As seen most clearly in FIG. 2, the housing defines a first inlet opening 26, a second opening 28 and an oppositely disposed outlet opening 30.

Figure 1:
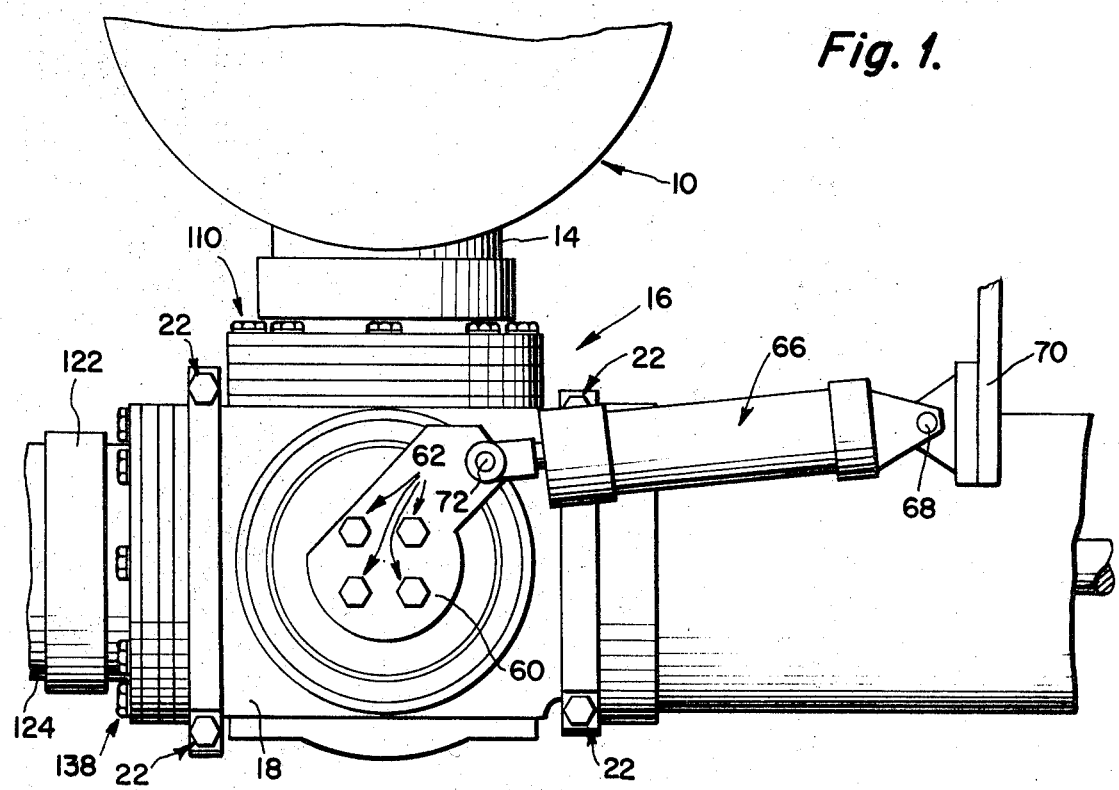
FIG. 1 is an elevation of a valve according to the present invention.
Figure 3:
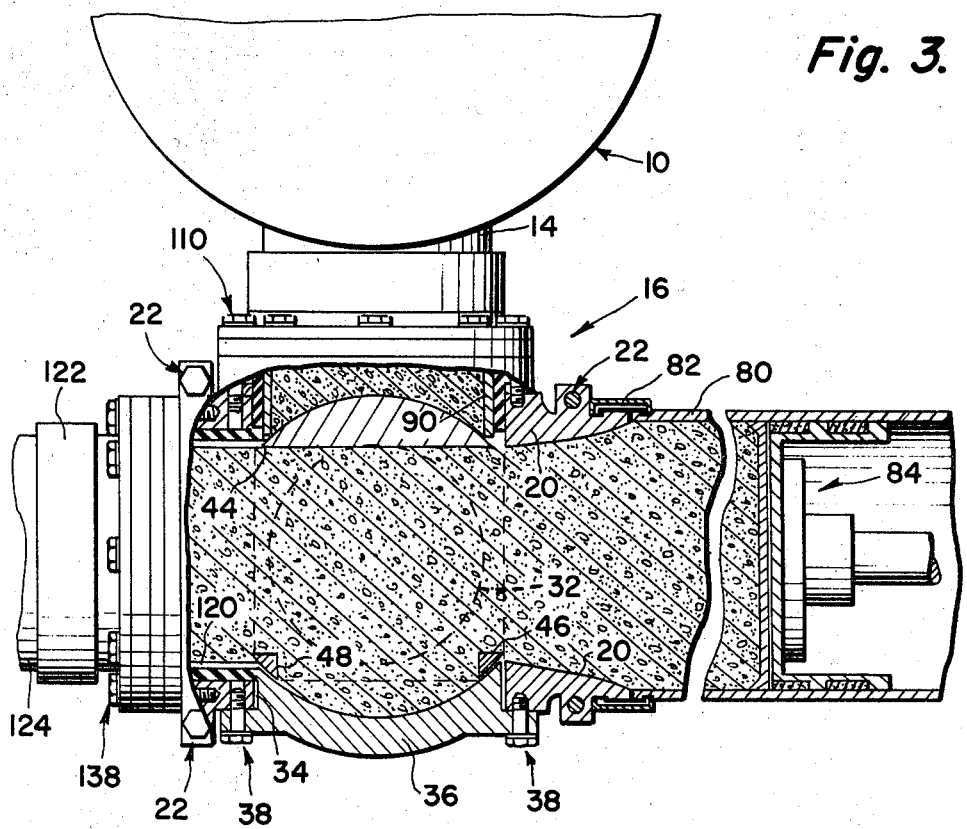
FIG. 3 is a view similar to FIG. 2 showing the parts in a different operative position.

The housing also includes two oppositely disposed aligned holes disposed perpendicular to the paper as seen in FIGS. 1—3 and indicated by reference character 32 which support bushings within which opposite journal portions of the ball valve hereinafter described are supported. The housing also includes an opening 34 disposed opposite to the opening 26, opening 34 being closed by a cover 36 secured in place by a plurality of cap screws 38 extending through suitable aligned holes provided in cover 36 and the housing.

Figure 4:
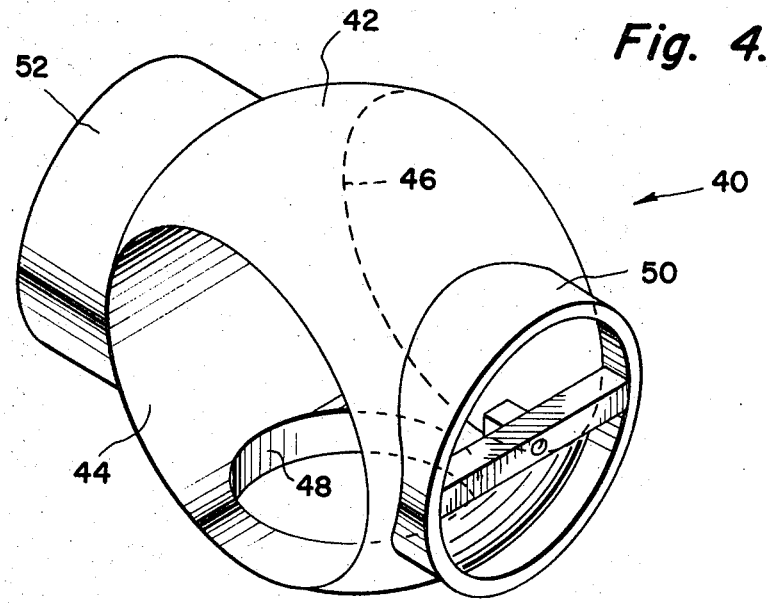
FIG. 4 is a top perspective view of the ball valve of the present invention.

Referring now to FIG. 4 of the drawings, the ball valve of the present invention is indicated generally by reference numeral 40. This ball valve is formed of stainless steel and includes an outer portion 42 defining portions of a spherical surface. The ball valve includes aligned ports 44 and 46 formed at opposite sides thereof and defines a generally cylindrical passage through the ball valve, and a third port 48 is in communication with this passage and extends at right angles to the aligned ports 44 and 46. The ball valve also includes oppositely extending generally cylindrical journal portions 50 and 52 which are supported in suitable bushings mounted on opposite sides of the housing so that the ball valve is rotatably journaled within the housing.

As seen in FIG. 1, the operating means for the ball valve includes an operating arm 60 secured as by screws 62 to one end of the ball valve, a double-acting hydraulic ram 66 being provided for controlling the movement of the ball valve. This ram may be remotely controlled in the usual manner. The ram is pivotally connected by a pin 68 with a fixed structure 70, and the piston rod of the ram is pivotally connected at 72 to the operating arm 60. It is apparent that operation of the ram will cause the valve to be rotated between its two operative positions as hereinafter described.

As seen most clearly in FIG. 2, the opening 28 formed in the housing of the valve provides communication with the interior of a pumping chamber 80 which is of generally cylindrical construction. A suitable clamp mechanism 82 is provided for interconnecting the housing with the pumping cylinder. A hydraulically operated piston indicated generally by reference numeral 84 is mounted for reciprocation within the pumping chamber, and opposite movements of the pumping piston will serve to suck concrete into the pumping chamber and then subsequently out of the pumping chamber as hereinafter more fully described.

A first valve seat means 90 extends within the inlet opening 26 of the housing, the upper end of this valve seat means being secured by means of a suitable clamp 92 with the outlet portion 14 of the hopper as previously described. The lower end 94 of the first valve seat means includes an inner chamfered edge adapted to engage the outer spherical surface of the ball valve to provide a seal therewith.

The first tubular one piece valve seat means 90 is generally cylindrical in configuration and includes a radially outwardly directed circumferentially extending flange 100. An annular shim 101 formed of a suitable metallic substance or the like is disposed on the housing in surrounding relationship to the opening 28 thereof. A first seal means 102 of generally L-shaped cross-sectional configuration is formed of a suitable sealing substance such as rubber or plastic and the like and is interposed between the housing and the adjacent valve seat means as well as between shim 101 and the flange 100.

A further annular seal means 104 formed of a material similar to seal means 102 is interposed between flange 100 and an annular shim 106 formed of a material similar to shim 101. These components are maintained in the assembled relationship illustrated by a plurality of cap screws 110 extending through suitably aligned holes formed in the various members.

Cap screws 110 and shim means 101, 106 afford a means for adjusting the position of the valve seat means relative to the housing. It is apparent that the cap screws 110 can be removed and different size shims inserted or removed as required for taking up any amount of wear which may occur between the valve seat means and the outer surface of the ball the ball valve.

A second tubular one piece valve seat means 120 extends within the opening formed in the housing, this valve seat means being interconnected by a suitable clamp 122 with an outlet conduit 124.

Valve seat means 120 is provided with a radially outwardly directed peripherally extending flange 130. A seal means 132 similar to the seal means 102 previously described is interposed between the housing and the valve seat means 120. A further annular seal means 134 of a material similar to seal means 132 is interposed between flange 130 and a shim 136 formed of a material similar to the previously described shims. These components are maintained in the assembled relationship illustrated by a plurality of cap screws 138 extending through suitable aligned holes provided in the various members.

Here again, it is apparent that the cap screws and the shim provide a means for adjusting the relative position of the valve seat means 120 with respect to the housing to take up for any wear between the valve seat means and the associated ball valve. As in the case of the previously described valve seat means, the end thereof in contact with the ball valve is provided with an inner chamfered edge to provide a tight seal therewith.

In the position of the apparatus shown in FIG. 2, the supply hopper is in communication through the ball valve with the pumping chamber. As the pumping piston moves to the right, concrete will be sucked downwardly into the pumping chamber.

When the piston 84 is moved to the right to its limit of movement, the ball valve is moved into the operative position shown in FIG. 3. In this position, communication between the supply hopper and the pumping chamber is cut off, and the pumping chamber is in communication with the outlet conduit. It will be noted that the valve provides a flow channel of substantially round cross section and that a straight flow path is provided between the pumping chamber and the outlet conduit in the position shown in FIG. 3. Additionally, the opening 28 is formed by a tapered wall of the valve housing and in cross section defines a portion of a hyperbolic curved wall. This tapered wall portion in combination with a substantially round flow of concrete is obtained through the valve.

Referring now to FIG. 5 of the drawings, a modified form of the invention is illustrated. This construction is in many respects like that shown in FIG. 2, and similar parts have been given the same reference numerals primed. In this form of the invention, a first valve seat means 150 extends within the inlet opening 26' of the housing, the upper end of this valve seat means being secured by means of a suitable clamp 152 with the outlet of portion 14' of the hopper. The lower end 154 of this valve seat meats includes a chamfered edge adapted to engage the outer spherical surface of the ball valve to provide a seal therewith.

This valve seat means is generally cylindrical in configuration and includes a radially outwardly directed circumferentially extending flange 160. A plurality of metallic annular shims 162 which may be of 20 gauge material, for example, are interposed between flange 160 and the adjacent housing portion. A plurality of annular rubber bushings rings 16 are interposed between the housing and the adjacent valve seat means. These components are maintained in the assembled relationship illustrated by a plurality of cap screws 166 extending through suitable holes provided in flange 160 and aligned threaded holes formed in the housing.

The cap screws 166 and shims 162 afford a means for adjusting the position of the valve seat means relative to the housing in a manner similar to that previously described.

A second valve seat means 170 extends within the opening 30' formed in the housing, the valve seat means being interconnected by a suitable clamp 172 with an outlet conduit 124'.

A plurality of annular metallic shims 182 are interposed between a flange 180 formed integral with valve seat means 170 and the adjacent housing portion. A plurality of annular rubber bushing rings 184 are interposed between the housing and the adjacent valve seat means.

The components associated with the second valve seat means are maintained in the assembled relationship illustrated by a plurality of cap screws 186 extending through suitable holes provided in flange 180 and aligned threaded holes formed in the housing.

It is evident that the position of the second valve seat means with respect to the housing may be readily adjusted by means of the cap screws 186 and the shims 182 as aforedescribed. As in the case of the previously described valve seat means, the end 190 of valve seat means 170 is provided with a chamfered edge to provide a tight seal with the associated ball valve.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A valve for controlling the flow of concrete, comprising a housing having an inlet opening for communication with a hopper, a second opening at substantially right angular relationship with respect to the inlet opening for communication with a pumping chamber, and a third opening opposite and aligned with the second opening for communication with an outlet conduit, a ball valve journaled for rotation in said housing and having an outer surface defining portions of a spherical surface:

first one piece valve seat means extending within said inlet opening and engageable with the outer surface of said ball valve;

first seal means carried by and surrounding said first seat means and in engagement with adjacent portions of the housing;

second one piece valve seat means extending within said third opening and engageable with the outer surface of said ball valve;

second seal means carried by and surrounding said second valve seat means and in engagement with other adjacent portions of the housing;

adjustment means carried by the first valve seat means to adjust same; and adjusting means carried by the second valve seat means to adjust same.

2. A valve as defined in claim 1, wherein said first and second valve seat means is tubular.

3. A valve as defined in claim 1 wherein said second opening in said housing is defined by a tapered wall portion.

4. A valve as defined in claim 1 wherein said tapered wall portion has a cross-sectional configuration defining a portion of a hyperbolic curve.

5. A valve as defined in claim 1 wherein said ball valve is formed of stainless steel.

6. A valve as defined in claim 1 wherein said ball valve is of a three-way type having three ports therein and defining a through channel in one position of the ball valve between an associated pumping chamber and an associated outlet conduit.

7. A valve as defined in claim 1 wherein means for adjusting the position of said first and second valve seat means includes removable shim means.

8. A valve as defined in claim 1 including cap screws cooperating with said shim means.

9. A valve as defined in claim 1 wherein each of said valve seat means includes an outwardly directed peripherally extending flange, said cap screws extending through said flange.

10. A valve as defined in claim 1 wherein said housing includes two cast halves interconnectable with one another, said ball valve being formed of stainless steel and being a three-way type having three ports formed therein, said means for adjusting said first and second valve seat means including removable shim means.